Oct. 9, 1962 D. C. GERNES ETAL 3,057,681
PRODUCING ALUMINIUM FLUORIDE
Filed Jan. 13, 1960 3 Sheets-Sheet 1

FIG. 1.

INVENTORS
DONALD C. GERNES
WILLIAM R. KING
BY
ATTORNEY

INVENTORS.
DONALD C. GERNES
WILLIAM R. KING

BY
ATTORNEY

FIG. 4.

United States Patent Office 3,057,681
Patented Oct. 9, 1962

3,057,681
PRODUCING ALUMINUM FLUORIDE
Donald C. Gernes, Los Gatos, and William R. King, Sunnyvale, Calif., assignors to Kaiser Aluminum & Chemical Corporation, Oakland, Calif., a corporation of Delaware
Filed Jan. 13, 1960, Ser. No. 2,275
16 Claims. (Cl. 23—88)

This invention relates to an improved process for the production of aluminum fluoride from fluosilicic acid and alumina hydrate.

Aluminum fluoride finds use in many industrial processes. It is one of the minor constituents added to the electrolytic cells during the production of aluminum. It is also used in the preparation of white enamels, as an anti-reflection coating in complex optical systems, as a constituent in welding fluxes, in the preparation of fluorine-containing glasses, etc.

Aluminum fluoride does not occur in any natural deposits except for the very rare mineral fluellite $$(AlF_3 \cdot H_2O)$$

Therefore, for industrial purposes, it must be manufactured. Generally, it is well known that aluminum fluoride may be produced by stoichiometrically reacting hydrated alumina or an alumina-containing material with fluosilic acid in an aqueous solution at elevated temperatures. Aluminum fluoride is formed in the solution. Insoluble silica is also formed as one of the reaction products and remains suspended in the solution. The removal of the suspended silica from the solution is very difficult, since the silica may be present in a gelatinous form. The difficulty may be overcome by using dilute (1–3 percent) solutions; however the process becomes uneconomical commercially thereby. Another problem to contend with is the retention of $AlF_3$ (hydrated) by the silica precipitate. Various procedures have been advanced for the preparation of aluminum fluoride which allegedly overcome the above mentioned difficulties and at the same time achieve a high yield of product.

U.S. Patent No. 2,842,426 issued July 8, 1958, to E. M. Glocker describes a process whereby substantially pure aluminum fluoride is prepared by reacting bauxite with not more than its stoichiometric equivalent of hydrofluoric or hydrofluosilicic acid at temperatures in the range of 100°–190° F. (37.8°–88° C.). It is preferred to operate the process with an excess of 5–15% alumina in the reaction mixture. Critical conditions are recited for conducting the reaction in order to separate the resulting aluminum fluoride solution from the unreacted solids and silica at the proper time, i.e., the point of maximum solubility of the aluminum fluoride.

British Patent No. 782,423 to Fisons Ltd. discloses a process for the preparation of aluminum fluoride which involves adding fluosilicic acid of a concentration in the range 5–15% by weight to an aqueous slurry of aluminum hydroxide, whereby the silica is obtained in an easily filterable condition. The reaction is carried out desirably with stoichiometrical amounts at preferred temperatures of 80°–100° C., or at 60°–75° C. At the preferred temperature range, the use of excess aluminum hydroxide does not appear to possess any advantage. At 60°–75° C. the use of excess aluminum hydroxide appears to assist the filtration of the silica.

The present invention provides for an improved process for the production of aluminum fluoride from alumina hydrate and fluosilicic acid whereby there are obtained a supersaturated aluminum fluoride solution, an easily filterable silica precipitate, high yields, and a minimum loss of fluoride to the silica precipitate.

In accordance with the present invention, aluminum fluoride is produced by adding solid, finely divided alumina hydrate to a fluosilicic acid solution. The temperature of the reaction is within the range of about 60°–70° C. and preferably about 65° C. The fluosilicic acid should have a fluorine to silicon mole ratio of less than 6, i.e., it should be a silica-rich acid. The finely divided alumina hydrate is continuously added to an excess of acid for a period of about one-half hour or more. After the addition of all the alumina hydrate to the acid, there is an additional digestion period of at least about two hours to complete the reaction. After the digestion period, the reaction liquor is filtered hot and the insoluble silica is easily separated therefrom. Solid aluminum fluoride trihydrate is crystallized from the hot filtrate liquor by the addition of aluminum fluoride seed. The crystals of aluminum fluoride trihydrate obtained are dehydrated to produce the final product of anhydrous aluminum fluoride. The spent liquor from the crystallization step is processed and returned to the reaction step for further production of aluminum fluoride. Also, in accordance with the invention, there is included a novel process for obtaining a refined fluosilicic acid liquor, suitable for use in the reaction step, from crude fluosilicic acid by distillation whereby the fluosilicic acid is vaporized and the vapors then absorbed by spent liquor from the crystallization step.

THE REACTION STEP

The reaction between fluosilicic acid and alumina hydrate in an aqueous medium produces aluminum fluoride in solution and a silica precipitate as follows:

$$H_2SiF_6 + 2Al(OH)_3 = 2AlF_3 + SiO_2 + 4H_2O$$

In order to commercially produce the aluminum fluoride economically, it is necessary to obtain a higher percentage conversion, a supersaturated aluminum fluoride solution having a concentration of about 9%, and a readily, easily filterable silica. Furthermore, loss of aluminum fluoride to the silica filter cake should be kept at a minimum. These requirements are readily achieved by this invention by conducting the reaction under certain critical operating conditions.

The order of combining the reactants materially affects the reaction. The continuous addition of solid alumina hydrate to the acid in solution produces a faster filtering silica cake and a higher percentage of conversion than the gradual addition of the acid to a slurry of the alumina or the rapid mixing of acid and alumina.

Table I shows the effect of the order of combining alumina trihydrate and $H_2SiF_6$ on the filterability of the silica precipitate produced in the reaction. In each test one reactant was continuously added to the other reactant over a period of thirty minutes and the reaction mixture stirred for an additional two hours; the temperature was maintained at 65° C. In tests 1–3, alumina trihydrate was added to approximately 900 grams of 8.5% $H_2SiF_6$. In tests 4 and 5 the $H_2SiF_6$ was added as 30% acid to a slurry of alumina trihydrate in about 700 grams of water.

Table I
EFFECT OF ORDER OF ADDITION OF REACTANTS

| Test No. | Order of Addition | Reactant in excess | Filterability of silica precipitate | Percent conversion [1] |
|---|---|---|---|---|
| 1 | $Al(OH)_3$ to $H_2SiF_6$ | 10% $Al(OH)_3$ | Fast | 100 |
| 2 | ----do---- | Neither | ----do---- | 86 |
| 3 | ----do---- | 10% $H_2SiF_6$ | ----do---- | 97 |
| 4 | $H_2SiF_6$ to $Al(OH)_3$ | 10% $Al(OH)_3$ | Slow | 71 |
| 5 | ----do---- | 10% $H_2SiF_6$ | ----do---- | 84 |

[1] Based on Al content of $AlF_3$ solution made.

The rate of addition (feeding time) of the alumina hydrate to the acid solution also affects the filterability of the silica cake produced and the loss of fluorine to the cake. Table II shows the effect that different rates of addition of alumina hydrate have on the filterability of the silica cake produced and on the loss of fluorine to the cake. In each test, 125.5 grams of $Al(OH)_3$ was fed to 8.48% $H_2SiF_6$ (in 5% excess over stoichiometric amounts) at varying rates. The temperature was maintained at 65° C. and the total reaction time was 2.5 hours, except as noted. The reaction mixtures were filtered through a No. 42 Whatman filter paper on an 11 cm. Buechner funnel. The pressure difference across the filter was 27 inches of mercury. The cakes varied in thickness from 18 mm. for fast filtering to 35 mm. for slow filtering precipitates.

in excess of stoichiometric amount. The reactions were all conducted at 65° C. The $Al(OH)_3$ was fed to the heated acid at different rates so that feed times of 30 minutes, 1 hour and 2 hours for the 2.530 kg. of $Al(OH)_3$ were required. Total reaction time in each case was 4 hours, after which the reaction mixtures were filtered hot (65° C.). In the filtering operation the reaction mixtures were agitated at 65° C. and a 0.1 sq. ft. filter leaf was immersed therein for 15 seconds, a cake forming time to give at least a ¼ inch cake. In some of the tests, as noted in Table III, the cake forming time was 30 seconds.

Table IV gives further data on filtration tests for 30 minute and 60 minute time periods for addition of alumina. The tests of Table IV were under the same conditions as those of the tests of Table III, except that no excess acid was used. The fluosilicic acid used contained 20.8% F and 5.91% Si. It was diluted to 8.1% equivalent $H_2SiF_6$. The reactions were conducted at 65° C., and the total reaction time was 4 hours. The filtration tests made on the reaction mixtures were carried on in the same manner as those for the tests shown in Table III.

Table III

FILTRATION COMPARISON TEST FOR DIFFERENT TOTAL ALUMINA FEED TIME FILTRATION DATE OF REACTION AT 65° C.

0.1 ft.² filter leaf, Dynel cloth, absolute pressure 250 mm. Hg for cake form, wash, and dry—test made four hours after the beginning of feed to the reaction

30 minutes feed

| Test | Temp. °C. | Filtration time, sec. | | | Volume, ml. | | Cake weight, grams | | Percent dry solids of wet cake | Cake thick., inches | Volume ratio wash H₂O, liquid in cake | Wash rate ml./sec. | F (percent of dry cake) | Percent solids in slurry |
|---|---|---|---|---|---|---|---|---|---|---|---|---|---|---|
| | | Form | Wash | Dry | Filtrate | Wash | Wet | Dry | | | | | | |
| 1 | 65 | 15 | 10 | 10 | 844 | 266 | 122.1 | 37.8 | 30.9 | 0.50 | 3.16 | 26.6 | | 3.91 |
| 2 | 65 | 15 | 15 | 10 | 869.5 | 490 | 149.0 | 39.5 | 26.5 | 0.56 | 4.47 | 32.7 | | 3.90 |
| 3 | 65 | 15 | 20 | 10 | 855 | 530 | 128.6 | 38.6 | 30.0 | 0.56 | 5.90 | 26.5 | | 4.00 |
| 4 | 65 | 15 | | 10 | 771 | | | | | 0.50 | | | | |
| 5 | 65 | 15 | | 10 | 760 | | | | | 0.50 | | | | |

1 hour feed

| 1 | 65 | 15 | | 10 | 870 | | | | | 0.44 | | | | |
| 2 | 65 | 15 | | 10 | 900 | | | | | 0.50 | | | | |
| 3 | 65 | 15 | | 10 | 895 | | | | | 0.47 | | | | |
| 4 | 65 | 25 | 12 | 10 | 1,192.4 | 263 | 126.2 | 50.8 | 40.3 | 0.53 | 3.49 | 22.0 | 1.99 | 4.125 |

2 hours feed

| 1 | 65 | 15 | | 10 | 840 | | | | | 0.28 | | | | |
| 2 | 65 | 15 | | 10 | 765 | | | | | 0.28 | | | | |
| 3 | 65 | 30 | | 10 | 1,240 | | | | | 0.43 | | | | |
| 4 | 65 | 30 | | 10 | 1,220 | | | | | 0.46 | | | | |
| 5 | 65 | 30 | 10 | 10 | 1,271.3 | 220 | 107.0 | 57.7 | 54.0 | 0.56 | 4.47 | 22.0 | | 4.20 |

Table III shows comparative results of filtration tests (which were of a substantially larger scale than the tests of Table II), for 30 minutes, 1 hour and 2 hour time periods for addition of alumina. The tests were carried out in a 30 liter tank, and the charge to the tank consisted of 10.45 kg. of 23.5% $H_2SiF_6$, 18.52 kg. of tap water and 2.530 kg. of $Al(OH)_3$, the acid being 5%

Table II

EFFECT OF RATE OF ADDITION OF $Al(OH)_3$

| Exp. No. | Time of addition of 125.5 g. Al(OH)₃ (min.) | Filtration time (min.) | Weight of wet cake, (g.) | Weight of dry cake, (g.) | Dry solids (percent of wet cake) | Wash rate, (cc./min.) | Wash Ratio: H₂O Used/-liquor hangup | F in dry cake (percent) | F loss, (percent of total fluorine) | Percent reaction |
|---|---|---|---|---|---|---|---|---|---|---|
| 1 | 5.0 | 25.0 | 403.2 | 74.6 | 18.5 | <4 | 0.61 | 13.51 | 10.10 | 100 |
| 2 | 15.0 | 8.0 | 383.0 | 78.2 | 20.4 | 50 | 0.66 | 12.37 | 10.05 | 100 |
| 3 | 15.0 | 6.0 | 380.1 | 69.0 | 18.2 | 104 | 1.03 | 8.59 | 6.16 | 100 |
| 4 | 15.0 | 3.0 | 367.0 | 80.4 | 21.9 | 195 | 1.57 | 10.91 | 9.13 | 96.7 |
| 5 | 30.0 | 7.0 | 344.8 | 74.74 | 21.6 | 100 | 0.74 | 13.84 | 10.75 | 100 |
| 6 | 60.0 | 3.5 | 344.1 | 71.3 | 21.4 | 100 | 0.76 | 7.34 | 5.44 | 94.4 |
| 7 [1] | 60.0 | 2.5 | 299.7 | 63.0 | 21.0 | 300 | 1.90 | 2.97 | 1.93 | 98.5 |
| 8 [2] | 90.0 | 1.5 | 245.2 | 59.0 | 24.0 | 900 | 2.00 | 3.57 | 2.16 | 98.3 |

[1] 3.7 hours reaction time.
[2] 4.0 hours reaction time.

Table IV
FILTRATION TEST RESULTS AFTER 240 MINUTES' REACTION 60 minutes feed time

| Test | Filtration time, sec. | | | Cake thick, in. | Volume, ml. | | Cake weight, g. | | Volume ratio wash $H_2O$, liquid in cake | Percent dry solids in wet cake | Percent solids in slurry | Wash rate, ml./sec. | Percent F in dry cake |
|---|---|---|---|---|---|---|---|---|---|---|---|---|---|
| | Form | Wash | Dry | | Filtrate | Wash | Wet | Dry | | | | | |
| 1 | 20 | 10 | 10 | 0.56 | 897 | 333 | 171 | 45.3 | 2.66 | 26.6 | 4.28 | 33.3 | 1.45 |
| 2 | 20 | 20 | 20 | 0.56 | 871 | 617 | 168 | 43.8 | 4.99 | 26.2 | 4.28 | 30.9 | 1.44 |
| 3 | 20 | 30 | 30 | 0.56 | 829 | 934 | 162 | 43.3 | 7.85 | 26.6 | 4.28 | 31.1 | 1.47 |

30 minutes feed time

| | | | | | | | | | | | | | |
|---|---|---|---|---|---|---|---|---|---|---|---|---|---|
| 1 | 20 | 10 | 10 | 0.56 | 671 | 217 | 176 | 35.1 | 1.54 | 20.0 | 4.18 | 21.7 | 2.06 |
| 2 | 20 | 20 | 20 | 0.56 | 653 | 407 | 170 | 34.5 | 3.00 | 20.3 | 4.18 | 20.4 | 1.48 |
| 3 | 20 | 30 | 30 | 0.56 | 634 | 580 | 165 | 33.4 | 4.39 | 20.2 | 4.18 | 19.3 | 1.43 |

The results of Tables II, III and IV show that the fastest filtering cakes were obtained with the slowest additions of alumina hydrate. Additions made continuously for periods of about one hour to about two hours and preferably about one hour produced the fastest filtering silica cakes containing the lowest fluorine contents. The alumina hydrate should be added continuously during the addition period and the rate of addition does not necessarily have to be uniform. The additions should not be intermittent. Feed times of as low as one-half hour have been found suitable and produced a readily filterable silica with low fluorine loss.

A better reaction rate is obtained if the alumina hydrate added to the acid is very fine in particle sizes. The use of finer particle sizes instead of coarser sizes allows the maximum yield of aluminum fluoride to be achieved in less reaction time, and minimizes the loss of fluorine to the silica filter cake. Generally, it is satisfactory to use alumina hydrate of a particle size in the range of about 5 to 100 microns, and preferably having a particle size distribution wherein most of the material is about 40 microns in size.

The alumina used in the reaction may be any of the hydrated aluminas such as the trihydrate which is obtained from Bayer-plant operations.

An important factor in the filtering characteristics of the silica produced is the use of fluosilicic acid in the reaction which must have an F/Si mole ratio of less than 6, i.e., it should be a silica-rich acid. The lower limit of the F/Si ratio should be about 5. Preferably, the ratio should be closer to 5 since this favors the production of a readily filterable silica in the reaction. In the practice of the instant process, it is therefore necessary to control the ratio within the stated limits. The fluosilicic acid should be relatively pure and should not contain any appreciable amounts of impurities such as calcium and phosphorus.

Table V shows filtration comparison tests on two silica precipitates made from an HF-rich acid and one silica precipitate made from a silica-rich acid. The HF-rich fluosilicic acid was prepared by dissolving 35.7 grams of hydrated silica (77.9% $SiO_2$) in a solution made from 2678 grams of 48% HF and 15,405 grams of water. The HF-rich acid was reacted with 1,637.8 grams of alumina trihydrate at 65° C. by continuously adding the alumina trihydrate over a period of one hour and continuing the reaction for three more hours whereby a 9% $AlF_3$ solution was produced. The silica-rich fluosilicic acid had the composition, $H_2SiF_6 \cdot 0.5SiF_4$. 10.45 kg. of the silica-rich acid was reacted with 2.530 kg. of alumina trihydrate in 18.52 kilograms of water. The trihydrate was added over a period of one hour, the temperature of the reaction was maintained at 65° C., and the reaction was continued for three more hours to produce a 9% $AlF_3$ solution. Each reaction slurry was agitated and vacuum filtration tests were performed using a 0.1 sq. ft. filter leaf immersed in the slurry for 25 seconds, an arbitrary cake forming time to give at least a ½" cake.

Table V
FILTRATION COMPARISON TESTS ON SILICA PRECIPITATE MADE FROM HF-RICH AND $SiO_2$-RICH $H_2SiF_6$

| Acid | Filtration time (sec.) | | Filtrate volume (ml.) | Cake thickness (in.) | Filtration rate (ml./sec.) | Percent solids in cake |
|---|---|---|---|---|---|---|
| | Form [1] | Dry [2] | | | | |
| HF-Rich $H_2SiF_6$ | 25 | [3] 3 | 175 | <1/32 | 7 | |
| | 160 | [3] 5 | 465 | ~1/8 | 2.9 | 13.6 |
| $SiO_2$-Rich $H_2SiF_6$ | 25 | 10 | 1,192 | 0.53 | 47.7 | 40.3 |

[1] Refers to cake forming time necessary to produce ½" thick cake.
[2] Refers to drying time at 110° C., i.e., dewatering rate to obtain maximum percent solids in cake.
[3] Cracked.

The silica formed from the HF-rich acid reaction was found to be very slimy and produced a very difficultly filterable silica cake, whereas the silica-rich acid produced a readily and easily filterable silica cake.

An HF-rich fluosilicic acid may be converted into a silica-rich acid by reacting it with a silica cake obtainable from the aluminum fluoride reaction. An added benefit is obtained thereby in that any $AlF_3$ present in the silica cake is recovered.

With respect to the temperature of the reaction, it should be between about 60° and 70° C. with the optimum at 65° C. At temperatures above about 75° C., a poorer filtering silica cake and greater losses of fluorine are encountered. At temperatures lower than about 60° C., the rate of reaction is much slower. The reaction is exothermic. Consideration should be given to the heat of reaction, when operating at a stated temperature, by introducing the acid into the reaction zone at a somewhat lower temperature to compensate for the heat of reaction.

With respect to the concentrations of reactants involved in the reaction, they are chosen to obtain a supersaturated aluminum fluoride solution. The acid solution should have a concentration of about 8% to 10% $H_2SiF_6$ with 8.5% as optimum and should be present in excess over the stoichiometric amount necessary to react with the alumina hydrate. A 2% to 5% excess of $H_2SiF_6$ is preferred. Higher excesses of acid can be used; however, it would be wasted and uneconomical. The supersaturation of the aluminum fluoride solution obtained by the reaction is related to the concentration of acid used. Supersaturated aluminum fluoride solutions of about 9% concentration are easily obtainable upon reaction under the above stated conditions with yields up to about 99%.

At 65° C. equilibrium solubility is 0.8% $AlF_3$ for $AlF_3 \cdot 3H_2O$.

When all the alumina hydrate has been added to the acid, the mixture is digested for a suitable period of time to substantially complete the reaction. The total time required for the reaction, including both feeding and digestion time, will vary between about two and five hours. In this manner, the reaction will be substantially complete, i.e., the degree of reaction obtainable will be about 100%.

THE SILICA REMOVAL STEP

Upon completion of the reaction step, the silica should be immediately removed from the solution by filtration to minimize fluorine losses and to obtain a clear supersaturated liquor of aluminum fluoride. The conditions required to produce a readily, easily filterable silica precipitate have been stated heretofore.

The reaction slurry, usually containing about 4% solids, should be filtered hot, i.e., about 65° C. (or at about the same temperature used for the reaction). Filtration is faster when the slurry is hot. The silica filter cake should be washed with several displacements of water, preferably two, to keep the loss of fluorine to the filter cake to about 1% to 2%. Alumina losses to the filter cake are about 1%. The filtration of the silica containing liquor may be performed on any type of filtering apparatus such as by vacuum filtration, e.g., a rotary drum filter.

THE CRYSTALLIZATION STEP

Aluminum fluoride trihydrate crystals are recovered by crystallization from the supersaturated aluminum fluoride liquor after the silica filtration step. The crystallization is usually accomplished by addition of aluminum fluoride hydrate seed crystals to the liquor at elevated temperatures.

Generally, the rate of crystallization increases with both the amount of seed (surface) present and with increased temperature. The crystallization of a 9% $AlF_3$ liquor is a slow process. At 95° C. and with an amount of −100 mesh $AlF_3 \cdot 3H_2O$ seed initially present equal to the total $AlF_3$ present in the liquor, it is necessary to agitate the mixture for five hours to obtain a yield of about 90%. Crystallization under similar conditions in the absence of any seed will give a yield of only 3% in five hours. At temperatures of about 50° C., it is possible to obtain a yield greater than 90% in about five hours by using two or three times the amount of seed (surface) used at 95° C. Generally crystallization may be economically carried out at temperatures ranging from about 60° to 100° C. in suitable materials of construction. Above 85° C. materials of construction became an increasing problem and an increase in crystallization rate is likely to be offset by more expensive construction.

Crystallization temperatures between about 65° and 80° C. are best suited since operations within this range produce a good yield of product of suitable particle size, e.g., about +325 mesh, and provide seed for subsequent crystallizations. Operations at 80° C. allow a smaller seed ratio to be used than can be used at 65° C. for comparable crystallization times.

Crystallization of a 9% aluminum fluoride liquor at 80° C. with seed having a seed size of about 50 microns average diameter and a seed ratio of 1.0 (seed ratio= weight of $AlF_3$ in the seed added/$AlF_3$ content of the solution being crystallized) allows a concentration of 1.5% aluminum fluoride to be reached in about 4.5 hours. The same crystallization conditions at 65° C. instead of 80° C. will take about 7.2 hours. Crystallization at about 65° C. is advantageous, since the temperature of the liquor from the filtration step is about the same. However, faster crystallization rates are possible at the higher temperatures, but it is necessary to heat the liquor from the reaction step. The lower temperature crystallization requires an increase in tankage whereas the higher temperature crystallization requires heat.

With respect to the aluminum fluoride seed crystals, they may be anhydrous or preferably hydrated. Usually, the seed will be obtained from a prior crystallization step wherein the particles smaller than the desired product size are recycled, after separation from the product, to the crystallizer. The anhydrous seed may be obtained from the subsequent dehydration step wherein some product anhydrous aluminum fluoride particles are carried off in the gas stream passing through the kiln and are recovered therefrom. The seed used should preferably have a wide particle size distribution, e.g., from about 5 to 120 microns diameter with about 15 to 30% of the seed being less than 44 microns (−325 mesh) in diameter.

The yields to be expected in the crystallization step will be about 80 to 85% depending on the particular conditions present during the crystallization.

Another important factor of the crystallization step is that the liquor should be subjected to agitation in order that the crystals of hydrated aluminum fluoride will be subjected to attrition. The degree of agitation should be sufficient that the normal growth of crystals is balanced by attrition in order to obtain sufficient seed size crystals for recycle and use in subsequent crystallizations.

Upon completion of the crystallization and filtration of the product $AlF_3$ solids from the crystallization liquor, the filtrate will comprise a spent liquor of low $AlF_3$ content. The spent liquor is recycled to the reaction step. The spent liquor, prior to recycle, may be used to scrub the gases issuing from the subsequent dehydration step to recover HF. The spent liquor may also be treated in an evaporator to reduce the water content. Furthermore, as will be described hereinafter, the spent liquor may instead be cycled to an acid distillation step to recover acid vapors free from impurities.

THE DEHYDRATION STEP

The product crystals of aluminum fluoride trihydrate obtained from the crystallization step are first dried at about 110° C. to remove free water.

The chemically bound water is removed by a careful calcination to produce a product containing in excess of 95% $AlF_3$. Excessive abrading of the material during calcination should be avoided.

The bulk of the chemically bound water can be easily removed at moderate calcining temperatures of about 350° to 450° C. It is necessary, however, to perform a nearly complete dehydration of the material and this can be accomplished only at higher calcining temperatures of about 700° to 750° C. Generally, the removal of water, by calcination, from the $AlF_3 \cdot 3H_2O$ involves some loss of fluorine value due to hydrolysis. At the higher temperatures, in order to prevent excessive hydrolysis, calcination must take place in an atmosphere low in water vapor, hence the calciner must be indirectly fired if gas or oil is to be used as fuel. Furthermore, the residence time at the higher temperatures must be brief, because of the possibility of hydrolysis with the chemically bound water removed from the material.

A gas purge is necessary during the calcination step to control hydrolysis and a minimum amount of gas should be used. In general, the water content of the purge gas has little effect on the dehydration of the material; however, it has a decided effect on the degree of hydrolysis. When using the higher calcination temperatures, preferably there should be a sweep with a relatively dry purge gas to dilute the water vapor in the calciner and to facilitate its removal.

The use of moderate calcining temperatures requires an increase in the residence time of the material in the calciner. Longer residence times tend to increase the degree of hydrolysis.

The calcination is suitably conducted in an indirectly fired rotary kiln with temperatures at the outlet end of about 700° to 750° C. and at the inlet end around about 140° C. A residence time of about 50 minutes is satisfactory to produce a product containing less than 0.2% water. Residence times of as low as about 20 minutes can be used and are satisfactory. An air purge of about 2 to 4 cubic feet per pound of $AlF_3 \cdot 3H_2O$ is usually adequate.

The calcination may also be conducted as a two step heating process, the first step in a directly fired calciner, and the second step in an indirectly fired calciner. Thus, the material can be heated to about 450° C. by direct firing followed by an indirect firing step to temperatures of about 700° to 750° C.

The gases issuing from the calciner will contain a small amount of HF gas, due to hydrolysis, which is recovered by scrubbing the gases first with spent liquor from the crystallization step, and then with a limited amount of water.

ACID DISTILLATION AND RECOVERY STEP

In the process of producing aluminum fluoride as recited heretofore, the spent liquor is recycled from the crystallization step to the reaction step to minimize overall fluoride losses. Prior to recycle, an evaporation step is necessary to evaporate a substantial amount of wash water introduced into the process. The evaporation step is necessary even when concentrated make-up acid containing as much as 25% $H_2SiF_6$ is added to the spent liquor prior to the addition thereof to the reaction step. Evaporation requirements in the spent liquor can be substantially reduced and even eliminated, however, by the use of the spent liquor as absorber liquor for fluoride gases in a method of purifying crude fluosilicic acid to be described hereinafter.

As stated heretofore, the fluosilicic acid used in the aluminum fluoride production process should be relatively pure and should not contain any significant amounts of impurities. An important source of fluosilicic acid is that obtained as a by-product of the fertilizer industry. However, the crude acid, thereby available, contains significant amounts of $P_2O_5$, $SO_4$, and Ca as impurities. These impurities must be separated from the crude acid prior to its use in the production of $AlF_3$ since the impurities will contaminate the $AlF_3$ product to a prohibitive extent.

The impurities in the crude acid may be separated therefrom by distillation at proper temperatures whereby the fluosilicic acid and water content are vaporized and the non-volatile impurities remain as bottoms in the distillation unit and are removed therefrom. The vaporized fluosilicic acid (generally considered to exist in the vapor form as mixtures of HF and $SiF_4$) and water are then contacted with spent liquor as absorbing liquor whereby the fluoride gases can be absorbed without condensing the water originally associated with the crude acid. In this manner the need for evaporation of the spent liquor will be substantially eliminated. The purification step of the acid can be effectively and economically integrated into the overall process of producing aluminum fluoride.

In the operation of the acid purification method, it is preferred to use a distillation technique known as submerged combustion distillation. Due to the extreme corrosive conditions encountered in concentrating crude fluosilicic acid, submerged combustion distillation overcomes scaling difficulties common with conventional heat transfer surfaces. Submerged combustion distillation involves the use of hot gaseous products of combustion and excess air which are passed through the liquid being distilled and essentially all of the heat transfer occurs at the surface of the highly superheated bubbles of the gaseous products. The technique is particularly successful where solids precipitate as a result of the concentration of a liquid as is the case with the crude fluosilicic acid because of the relatively high calcium content.

Figure 2:
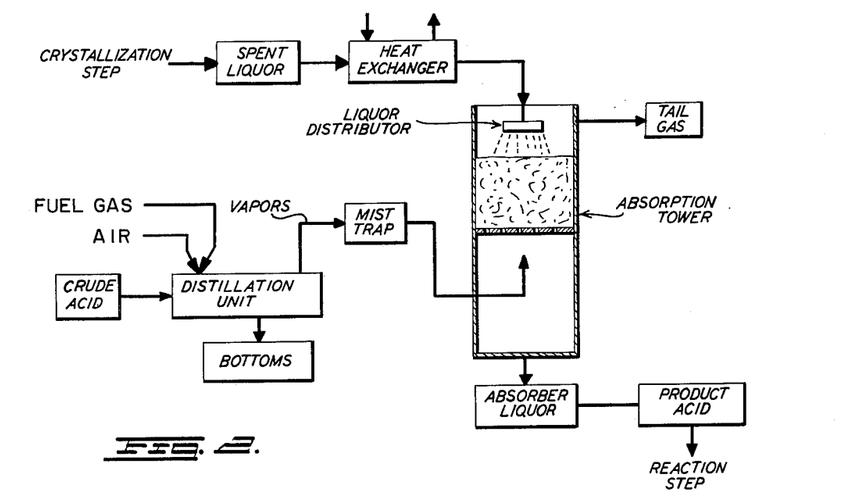

In FIGURE 2 there is shown a somewhat diagrammatic flow sheet of one method of purifying the crude fluosilicic acid comprising a distillation unit and a single stage absorber.

Figure 3:
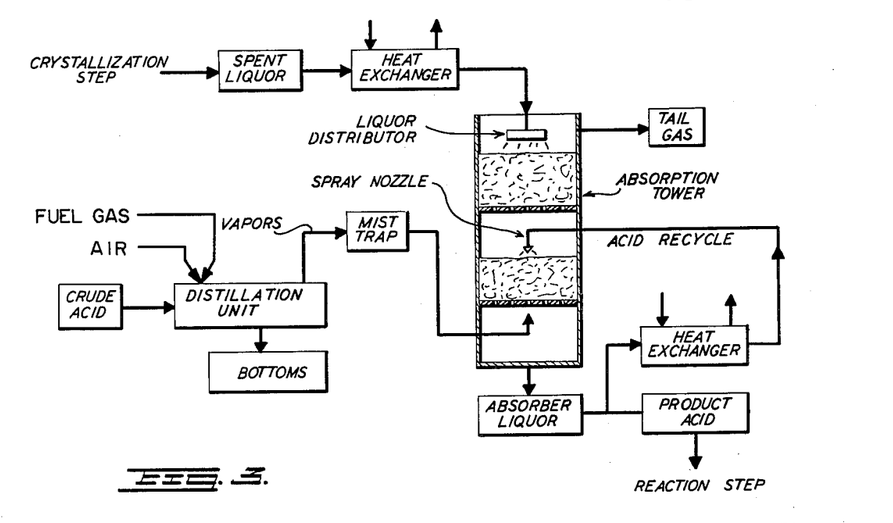

In FIGURE 3 there is shown a somewhat diagrammatic flow sheet of a preferred method of purifying the crude fluosilicic acid comprising a continuous-type distillation unit and a two-stage recovery unit arranged for recycle of the acid-fortified spent liquor to the first stage.

Referring to the method shown in the flow sheet of FIGURE 2, spent liquor from the crystallization step of the aluminum fluoride process is passed through a heat exchanger and then sprayed into the absorption tower through a liquor distributor. The temperature of the spent liquor should be maintained high enough to prevent condensation of water vapors in absorption tower. A temperature of above 165° F. is sufficient. Crude fluosilicic acid is passed to a distillation unit. The vapors evolved at a temperature in the range of about 205 to 210° F. are passed through a mist trap since any liquid entrained as mist in the vapors must be removed prior to acid recovery for maximum purification. The vapors enter the absorption tower and pass up through the packing, which can be Raschig rings. The acid vapors are absorbed in the descending spent liquor. The water vapors leave the scrubber in the tail gases. The refined acid obtained is cooled and is ready for use in the reaction step of the $AlF_3$ process. The tail gases are removed from the tower and contain minor amounts of fluoride values.

According to FIGURE 3, crude fluosilicic acid is introduced in continuous fashion into a relatively large volume of still "bottoms" liquor contained in the distillation unit. The bottoms, consisting of a highly concentrated solution of the impurities, fluosilicic acid and any precipitated impurities, are drawn off at a rate consistent with the impurity and fluosilicic acid content of the crude acid. The remaining fraction of the crude acid must be evolved as vapor by application of sufficient heat. The vapors evolved are passed through a mist trap since any bottoms liquor entrained as mist must be removed prior to acid recovery for maximum purification. The mist-free vapor is now ready for introduction to the first stage of the acid recovery unit, except for possible adjustment of the volume ratio of water vapor to carrier gas, the latter being considered here as gas which is neither condensable nor absorbable over the range of conditions used. The preferred proportion of water vapor to carrier gas corresponds to a dewpoint in the temperature range of 75°–80° C., a condition which leads to minimum fluoride losses in the tail gas from the recovery unit. When the submerged combustion distillation technique is used, sufficient excess air can be used to supply the carrier gas requirement directly if desired, and the vapors are evolved at a temperature of about 95° C.

The spent liquor from the aluminum fluoride crystallization step is passed through a heat exchanger and then sprayed into the second stage of the recovery unit through a liquor distributor. The temperature of the entering spent liquor can be maintained high enough to prevent condensation of water vapor in the recovery unit. The spent liquor descending through the second stage completes the separation of the fluoride gases from the water vapor saturated carrier gas to the point where the fluoride losses in the tail gases are relatively minor. The resulting liquor falls directly on the packing of the first stage of the recovery unit where it blends with a much larger volume of the fully fortified spent liquor recycled from the liquor outlet of the first stage. At least 95% of the fluoride gases in the entering vapor are absorbed in the first stage. Close control of the temperature of the first stage unit is achieved by passage of the recycled fortified spent liquor through a heat exchanger, since most of the heat to be removed is liberated in the first stage. The operation of the recovery unit can be adjusted readily to yield an acid-fortified spent liquor with the desired acid content as heretofore specified for the reaction step with alumina.

It has been discovered that the SiF$_4$-rich fluosilicic acids (mol ratio of F:Si between 5 and 6) can be recovered as described above without deposition of silica in the absorption unit. If fluosilicic acid is used instead of a spent liquor, silica deposition can still be prevented, but the acid concentration must be maintained considerably higher, which leads to greater fluoride losses, and spent liquor evaporation would still be required. The acid fortified spent liquor has been shown to be stable with respect to silica deposition at temperatures up to at least 80° C., even though the equivalent fluosilicic acid content is as low as 7% by weight. The step of recycling fortified spent liquor to the first stage absorber is desirable because it insures recovery of the large majority of the SiF$_4$ gas in a liquor having a high enough acid concentration and mol ratio of total fluoride to silicon to be stable. Contact of the remaining SiF$_4$ in the second stage absorber with spent liquor also does not lead to silica deposition even though the concentration of the resulting acid is relatively low. In this case, the quantity of free HF in the spent liquor used, as a result of scrubbing calciner off-gas, is more than sufficient to keep the resulting acid, HF-rich in the second stage.

The present invention will be further understood by the following examples which describe specific embodiments of a process of producing aluminum fluoride.

*Example 1*

Figure 1:
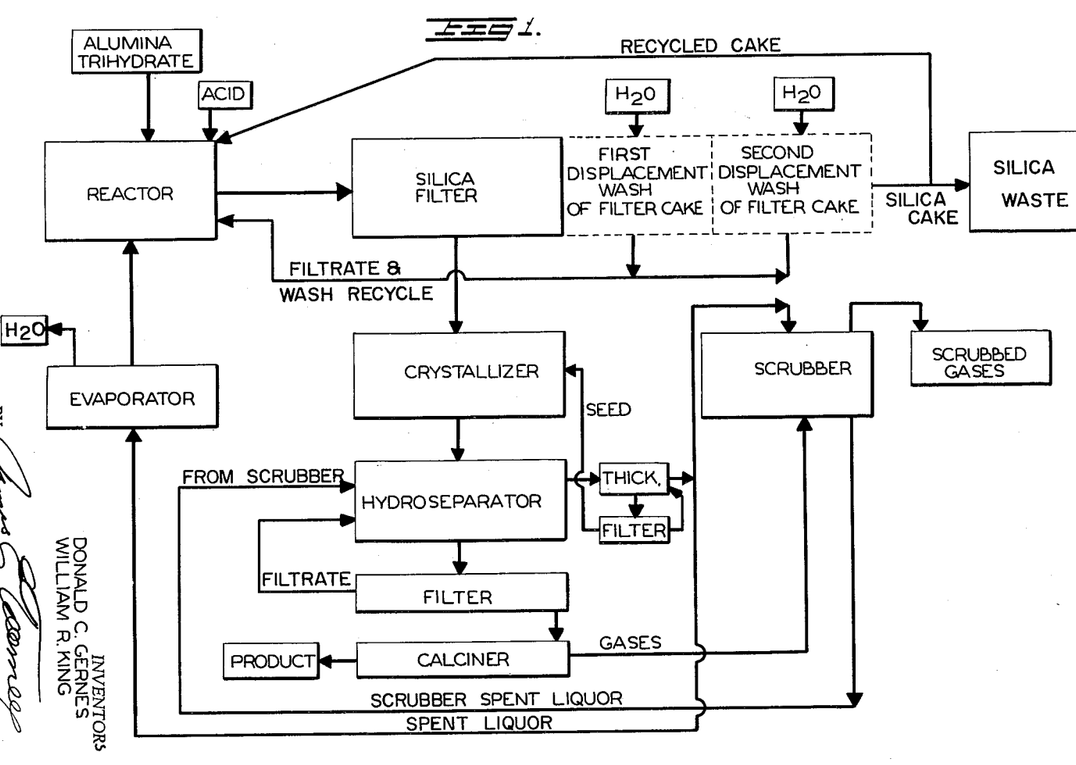

FIGURE 1 shows a flow sheet of an embodiment of the present invention.

To a rubber-lined reactor tank two recycled liquors are added: one is obtained from the evaporator and contains 17.70 parts AlF$_3$, 892.06 parts H$_2$O and 6.09 parts HF; the other, representing silica filter wash liquors, contain 7.32 parts AlF$_3$ and 149.67 parts H$_2$O.

A silica-rich fluosilicic acid having a rational analysis of 261.82 parts H$_2$O, 88.49 parts H$_2$SiF$_6$, 3.69 parts SiO$_2$ and at a temperature of 61° C. is also added to the reactor along with wet recycled silica cake containing 10.14 parts SiO$_2$, 0.7 part AlF$_3$ and 15.03 parts H$_2$O. The quantity of silica recycled represents a 50% excess over that theoretically required to reduce the mol ratio of fluorine (in acid form) to silicon, to a value of 5 to 1.

After agitating the mixture of acid, silica cake and recycled liquor briefly, 103.79 parts of finely divided Al(OH)$_3$ is slowly added over a period of one hour. The reaction mixture is maintained at a temperature of 65° C. and then further digested for 3.8 hours.

The digested reaction mixture, which is at a temperature of 65° C. and contains 137.49 parts AlF$_3$, 50.70 parts silica, 1368.31 parts H$_2$O, is filtered. The filtrate liquor is fed to the crystallizer. The silica filter cake containing 42% solids is washed with two displacements of water. The two washes are combined, and are recycled to the alumina reactor unit along with 20% of the wet silica filter cake.

The filtrate liquor in the crystallizer comprises 126.68 parts AlF$_3$ and 1293.46 parts H$_2$O. The crystallizer contains an air lift for agitating and circulating the liquor. The temperature of the liquor is raised to 80° C. Aluminum fluoride trihydrate seed from a previous crystallization is added to the liquor to increase the rate of crystallization of the AlF$_3$·3H$_2$O from the solution. The seed added has a wide distribution of particle sizes from 5 to 120 microns in diameter with 15 to 30% in the 44 micron range. The seed ratio is 1.0, and refers to the weight ratio of AlF$_3$ in the seed material to AlF$_3$ in the filtrate liquor. Crystallization is allowed to proceed with agitation and circulation for 4.5 hours after which time the contents of the crystallizer are pumped to a hydroseparator. The crystallization slurry containing about 25% solids is diluted with sufficient spent crystallization liquor as it enters the hydroseparator to yield two fractions: a 6% solids overflow containing nearly all of the −325 mesh (43 micron) particles of AlF$_3$·3H$_2$O plus surplus larger particles, and a 50% solids underflow containing the desired weight of product as +325 mesh particles. The product fraction is filtered and the 80% solids filter cake contains 108.98 parts AlF$_3$, and 113.46 parts H$_2$O. The spent liquor filtrate contains 1.97 parts AlF$_3$, 0.68 part HF, and 131.5 parts H$_2$O, and is recycled to the hydroseparator. The remainder of the spent crystallization liquor, which is required to dilute the crystallization slurry, contains 29.17 parts AlF$_3$, 16.35 parts HF and 1944.48 parts H$_2$O, and comes from the calciner scrubber unit to be described hereinafter.

The filter cake product is passed through an indirectly fired rotary kiln calciner at a residence time of about 50 minutes. The kiln has a temperature of 750° C. on the exit end and 140° C. on the inlet end. An air purge of about two cubic feet per pound of AlF$_3$·3H$_2$O is used. The air has a relative humidity of about 40%. The calcined product analyzes 100.00 parts AlF$_3$, 5.45 parts Al$_2$O$_3$, and contains less than 0.2% water.

The 6% solids overflow slurry from the hydroseparator is thickened to about 30% solids and then filtered. The filter cake is usable as seed for a subsequent crystallization step. The seed slurry filtrate is simply recycled to the seed slurry thickener. A portion of the seed thickener overflow liquor containing 1180 parts H$_2$O, 17.70 AlF$_3$ and 6.09 parts HF is evaporated to remove 287.94 parts H$_2$O and then recycled to the reaction unit. The remainder goes to the calciner off-gas scrubber unit.

In the calciner a minor amount of the fluorine in the entering AlF$_3$ is hydrolyzed to HF. The gases leaving the calciner contain 6.65 parts HF, 110.36 parts H$_2$O, and are fed to the scrubber where they are contacted with seed thickener overflow liquor containing 29.17 parts AlF$_3$, 10.03 parts HF and 1944.48 parts H$_2$O. The liquor from the scrubber unit containing 16.35 parts HF, 1944.48 parts H$_2$O, and 29.17 parts AlF$_3$ is recycled to the hydroseparator for dilution of the crystallization slurry.

*Example 2*

Figure 4:
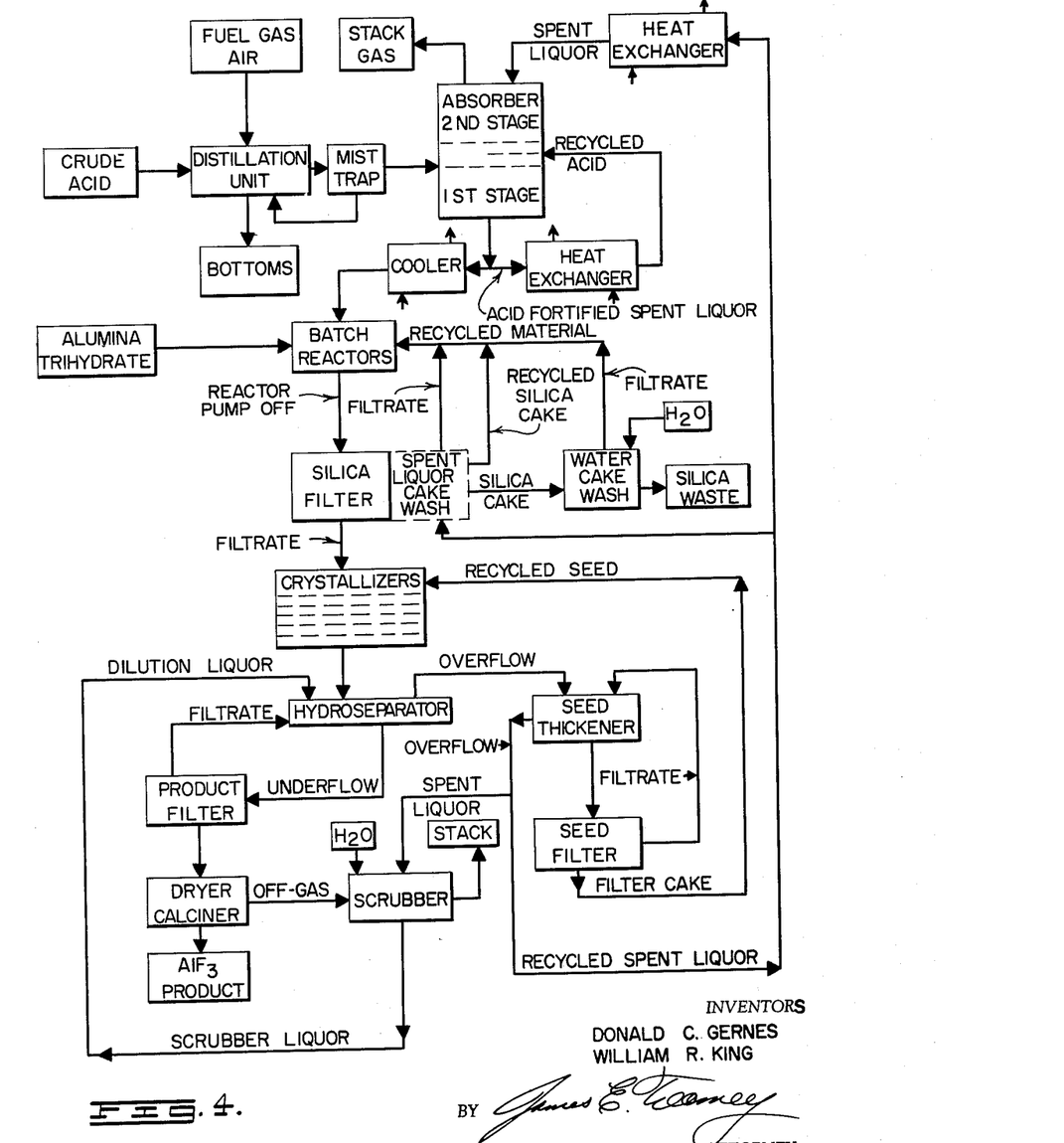

This example shows an embodiment of the invention for continuously producing AlF$_3$ wherein the refinement of crude fluosilicic acid is integrated into the process. FIGURE 4 shows a flowsheet of the process. The flowrates used correspond to a production of 100 lb. of AlF$_3$ per hour in the final calcined product.

A typical silica-rich, crude fluosilicic acid has a weight composition corresponding to 14.5% H$_2$SiF$_6$, 3.5% SiF$_4$, 1.15% (P$_2$O$_5$ and SO$_4$), 0.19% Ca and 80.66% H$_2$O by difference. The crude acid is charged to a submerged combustion type of distillation unit at the rate of 547.35 lb./hr. The heat input to the unit is controlled to distill off a vaporous mixture having a temperature in the range of about 205 to 210° F. such that the bottoms liquor will maintain a constant composition. Bottoms, including both liquid and solid impurities plus some fluosilicic acid are removed at a rate of 21.66 lb./hr. to keep a constant volume of bottoms in the still. Approximately 19,000 cu. ft. of air (at 70° 1 atm.) are used per hour, part for combustion and the remainder as carrier gas to control the dewpoint of the stack gas from the acid recovery unit such that little or no condensation of water vapor occurs. The vapors are evolved from the still at a rate of 626.49 lb./hr., exclusive of the dry carrier gas, and contain 72.10 lb. H$_2$SiF$_6$, 19.19 lb. SiF$_4$ and 434.4 lb. H$_2$O from the crude acid, and 100.8 lb. H$_2$O from the combustion gases. The vaporous mixture from the still is passed through a mist trap to remove any entrained bottoms which are recycled to the still.

The vaporous mixture leaving the mist trap is fed into the bottom of a two-stage absorption unit, similar to the one shown in FIGURE 3. At the same time, 1127.27 lb./hr. of spent crystallization liquor containing 16.57 lbs. AlF$_3$, 5.7 lbs. HF and 1105 lbs. H$_2$O are fed into the top of the second stage of the recovery unit. The resulting acid-fortified spent liquor is recycled to the top of the first stage unit at a rate of at least 1000 gal./hr. At the same time, 1217.24 lb./hr. of this refined acid-fortified spent liquor containing 91.30 lbs. $H_2SiF_6$, 4.37 lbs. $SiF_4$, 16.57 lbs. $AlF_3$ and 1105 lbs. $H_2O$, are recycled to the alumina reaction step. The stripped gas mixture leaves the second stage of the recovery unit at 167° F., the dewpoint for this example, and carries to the stack, 1.32 lbs./hr. of $H_2SiF_6$ along with all of the water vapor which entered (535.2 lb./hr.). Heat liberated in the recovery of the acid vapors is removed mainly by the heat exchanger for the acid recycled to the first stage absorber.

The total acid liquor used for production of $AlF_3$ by reaction with alumina consists of 1217.24 lb./hr. of the acid-fortified spent liquor, 209.06 lb./hr. of recycled silica cake wash liquors, and some 20% of the wet silica cake (26.41 lb./hr.) which amounts to 1452.71 lb./hr. The composition of the combined reaction liquor corresponds to 92.70 lb. $H_2SiF_6$, 3.36 lb. $SiF_4$, 25.72 lb. $AlF_3$, 10.14 lb. $SiO_2$ and 1320.79 lb. $H_2O$. The reaction step is performed batchwise by charging a number of stirred reactors at successive intervals. Finely divided alumina trihydrate is added at a rate of 103.79 lb./hr. for one hour to each reactor in turn and the reaction mixture maintained at a temperature of 150° F. A supersaturated (9%) aluminum fluoride solution containing precipitated silica is formed in about 4 hours in turn in each reactor. Reactor pumpoff (about 4% solids) is removed from the reaction step at a rate of 1556.5 lb./hr. and contains 137.49 lbs. $AlF_3$, 50.70 lbs. $SiO_2$ and 1368.31 lbs. $H_2O$.

The reactor pumpoff is filtered immediately to yield a pregnant liquor filtrate at the rate of 1420.14 lb./hr. which contains 126.68 lbs. $AlF_3$ and 1293.46 lbs. $H_2O$. The separated silica was washed first with one displacement (76.52 lb./hr.) of spent liquor containing 1.13 lbs. $AlF_3$, 0.39 HF and 75 lbs. $H_2O$, and which represents a portion of the overflow liquor from the seed slurry thickener. About 20% of the once-washed, wet silica cake (26.41 lb./hr.) containing 1.22 lbs. $AlF_3$, 10.14 lbs. $SiO_2$, 0.05 lb. HF and 15 lbs. $H_2O$ is recycled directly to the reaction step. The remaining silica cake is washed with water at the rate of 125.94 lbs./hr. to yield 128.26 lb./hr. of wash filtrate (2.1 lb. $AlF_3$, 0.22 lb. HF, and 125.94 lbs. $H_2O$) and 103.35 lb./hr. of washed cake containing 40.56 lbs. $SiO_2$, 2.79 lbs. $AlF_3$ and 60 lbs. $H_2O$, the latter being sent to waste. Both of the wash filtrates are recycled directly to the reaction step.

In the crystallization step, the pregnant liquor is fed continuously into the first of a group of crystallizers connected in series to provide a total average liquor retention time of about 8 hours. Recycled seed filter cake is also added to the first crystallizer at a rate of 297.76 lb./hr. and contains 208.12 lbs. $AlF_3 \cdot 3H_2O$, 1.32 lbs. $AlF_3$ dissolved 0.45 lb. HF and 87.87 lbs. $H_2O$ which corresponds to a seed ratio of 1.0. The effluent (22.5% solids) from the last crystallizer is removed at a rate of 1717.90 lb./hr. and now contains 386.08 lbs. $AlF_3 \cdot 3H_2O$ solids, 19.68 $AlF_3$, 0.45 lb. HF and 1311.69 lbs. $H_2O$. The temperature of the liquor during crystallization is maintained in the range of 150°–160° F.

The crystallizer effluent is pumped to a hydroseparator where it is diluted with sufficient spent liquor to yield an underflow of predominantly coarse particles (about 50% solids) which is sent to the product filter and an overflow (6% solids) which has a particle size distribution suitable for recycle as seed. The underflow is removed at a rate of 356.83 lb./hr. and contains 177.96 lbs. $AlF_3 \cdot 3H_2O$ product solids, 2.63 lbs. $AlF_3$, 0.91 lb. HF and 175.33 lbs. $H_2O$. The overflow is sent to the seed slurry thickener at a rate of 3485.23 lb./hr. and contains 208.12 lbs. $AlF_3 \cdot 3H_2O$ seed solids, 48.19 lbs. $AlF_3$, 16.57 lbs. HF and 3212.35 lbs. $H_2O$.

Filtration of the hydroseparator underflow yields a product filter cake of about 80% solids at a rate of 222.67 lb./hr. which contains 177.96 lbs. $AlF_3 \cdot 3H_2O$ solids 0.66 lb. $AlF_3$, 0.23 lb. HF and 43.82 lbs. $H_2O$. The spent liquor filtrate is recycled to the hydroseparator at a rate of 134.16 lb./hr. which returns 1.97 lbs. $AlF_3$, 0.68 lb. HF and 131.5 lbs. $H_2O$.

The product filter cake is passed through a dryer maintained at a temperature of 750° F. which reduces the LOI of the cake to about 4%. The partially dehydrated cake is then passed through an indirectly fired rotary calciner which heats the product to a maximum of about 1400° F., thereby reducing the LOI to about 0.2%. A small amount of air is used to sweep out the bound water and the HF formed by hydrolysis of part of the $AlF_3$. The calcined product is removed at a rate of 105.65 lb./hr. and contains 100 lbs. $AlF_3$, 5.45 lbs. $Al_2O_3$ and 0.2% $H_2O$, and is cooled prior to storage.

The hydroseparator overflow slurry and spent liquor filtrate from the seed filter are fed into the seed slurry thickener at a combined rate of 3883.67 lbs./hr. The thickener underflow (about 30% solids) is removed at a rate of 696.2 lb./hr. and filtered to produce a seed filter cake (70% solids) at the rate of 297.76 lb./hr. containing 208.12 lbs. $AlF_3 \cdot 3H_2O$ seed solids, 1.32 lbs. $AlF_3$, 0.45 lb. HF and 87.87 lbs. $H_2O$. This seed filter cake is recycled to the first of the series of crystallizers. The seed slurry filtrate is removed at the rate of 398.44 lb./hr. and contains 5.86 lbs. $AlF_3$, 2.02 lbs. HF and 390.56 lbs. $H_2O$. The seed thickener overflow of clear spent liquor is removed at a rate of 3187.47 lb./hr. and split into three fractions. One part corresponding to a rate of 1983.68 lb./hr. containing 29.17 lbs. $AlF_3$, 10.03 lbs. HF and 1994.48 lbs. $H_2O$ is fed to the calciner off-gas scrubber. Another part corresponding to a rate of 1127.57 lb./hr. is recycled to the acid recovery unit as heretofore described. The remainder of the overflow (76.52 lb./hr.) is used as the first wash of the silica cake as heretofore described.

The gases evolved in the dryer and calciner contain 6.65 lbs. HF and 110.36 lbs. water vapor on an hourly basis and are sent to a scrubber to recover fluorine values. The gases are scrubbed with the previously specified fraction of the spent liquor from the seed thickener overflow to recover all but 0.33 lb. of HF. In general air is blended with the hot gases from the calciner before they enter the scrubber to allow evaporation of some water without overheating the spent liquor. Water equivalent to the amount evaporated is sprayed into the second stage of the scrubber to improve fluorine recovery. The scrubber liquor leaves the absorber at a rate of 1990 lb./hr. and contains 29.17 lbs. $AlF_3$, 16.35 lbs. HF and 1944.48 lbs. $H_2O$. It is recycled to the hydroseparator for dilution of the crystallization slurry as heretofore described.

Although the invention has been described in connection with exemplary data and preferred embodiments, it is not intended to be limited thereto, and various modifications may be made thereto without departing from the spirit of the invention as defined in the appended claims.

What is claimed is:

1. A process of reacting alumina hydrate and fluosilicic acid to produce an aqueous, supersaturated aluminum fluoride liquor containing an easily separable silica precipitate comprising, continuously adding for a period of at least about one-half hour solid, finely divided alumina hydrate to a reaction liquor containing a stoichiometric excess of fluosilicic acid having an F/Si mol ratio of less than 6 at temperatures between about 60° and 70° C., digesting the resulting mixture at the said temperatures for a period of time until the reaction is substantially complete, and thereafter separating the silica precipitate formed from the digested liquor at the said temperatures. of $H_2SiF_6$ in the said reaction liquor is about 8%.

2. The process of claim 1 wherein the concentration of $H_2SiF_6$ in the said reaction liquor is about 8%.

3. The process of claim 1 wherein the reaction temture is about 65° C.

4. The process of claim 1 wherein the said stoichiometric excess of acid is about 5%.

5. The process of claim 1 wherein aluminum fluoride crystals are recovered from the silica-free liquor.

6. A process for producing aluminum fluoride by reacting alumina hydrate and fluosilicic acid which comprises, continuously adding for a period of at least about one-half hour solid, finely divided alumina hydrate to a reaction liquor comprising recycled spent liquor and a stoichiometric excess of about 5% of fluosilicic acid having an F/Si mole ratio of less than 6, the concentration of $H_2SiF_6$ in the reaction liquor being about 8.5%, at a temperature of between about 60° and 70° C., digesting the resulting mixture for a period of at least about two hours at said temperatures until the reaction is substantially complete, thereby obtaining a supersaturated aluminum fluoride liquor containing an easily separable silica precipitate which contains a minimum of fluorine values, thereafter immediately separating said silica from said supersaturated liquor, crystallizing aluminum fluoride from the supersaturated silica-free liquor at temperatures between about 65°–80° C. by the addition of aluminum fluoride seed, separating and recovering aluminum fluoride crystals from the crystallization liquor and thereby obtaining a spent liquor, and recycling said spent liquor to the reaction step.

7. The process of claim 6 wherein the aluminum fluoride crystals obtained from the crystallization liquor are separated into product crystals which are dehydrated by calcination, and seed crystals which are recycled to the crystallization step.

8. The process of claim 7 wherein the product aluminum fluoride crystals are calcined at a temperature of about 750° C. and the resulting calcination gases comprising HF are scrubbed with spent liquor.

9. The process of claim 6 wherein the reaction temperature is about 65° C.

10. The process of claim 6 wherein the crystallization temperature is about 80° C.

11. The process of claim 6 wherein the alumina hydrate added to the reaction step has a particle size in the range of about 5 to 100 microns.

12. The process of claim 6 wherein said alumina hydrate is alumina trihydrate.

13. A process for producing aluminum fluoride from alumina hydrate and crude fluosilicic acid containing impurities which comprises, distilling said crude acid to produce a vaporous mixture comprising $H_2O$ and $H_2SiF_6$, absorbing $H_2SiF_6$ from said vaporous mixture by contact with spent liquor from a subsequent step of the process to obtain a refined fluosilicic acid liquor, adding silica filter cake from a subsequent step of the process to said refined liquor to obtain a reaction liquor containing a stoichiometric excess of about 5% of fluosilicic acid having an F/Si mole ratio of less than 6 and a $H_2SiF_6$ concentration of about 8.5%, continuously adding for a period of at least about one-half hour solid, finely divided alumina hydrate to said reaction liquor maintained at a temperature between 60° and 70° C., digesting the resulting mixture for a period of at least about two hours at said temperatures until the reaction is substantially complete, thereby obtaining a supersaturated aluminum fluoride liquor containing an easily separable silica precipitate which contains a minimum of fluorine values, thereafter immediately separating said silica from said supersaturated liquor to obtain a silica filter cake a portion of which is recycled to said refined liquor, crystallizing aluminum fluoride from the supersaturated silica-free liquor at temperatures between about 65°–80° C. by the addition of aluminum fluoride seed, separating and recovering aluminum fluoride crystals from the crystallization liquor and thereby obtaining a spent liquor, and separating said recovered crystals into product crystals of relatively larger size which are dehydrated by calcination and seed crystals of relatively smaller size which are recycled to the crystallization step.

14. In a process of producing aluminum fluoride, wherein a reaction liquor comprising fluosilicic acid and alumina hydrate is digested at elevated temperatures to obtain a supersaturated aluminum fluoride liquor containing precipitated silica, said silica is separated from said supersaturated liquor, aluminum fluoride crystals are crystallized from said silica-free supersaturated liquor and a spent liquor is thereby obtained which is subsequently recycled and becomes a portion of said reaction liquor, the improvement of preparing said reaction liquor from crude fluosilicic acid which comprises, distilling said crude acid to produce a vaporous mixture comprising $H_2O$ and fluosilicic acid, absorbing $H_2SiF_6$ from said vaporous mixture by contact with said recycled spent liquor to obtain a refined fluosilicic acid liquor, and subsequently mixing alumina hydrate with said refined liquor to obtain a reaction liquor for producing aluminum fluoride.

15. The process of claim 14 wherein said vaporous mixture when produced is at a temperature in the range of about 205° F. to 210° F.

16. The process of claim 14 wherein a portion of said refined fluosilicic acid liquor is recycled and contacted with said vaporous mixture.

References Cited in the file of this patent

UNITED STATES PATENTS

| | | |
|---|---|---|
| 1,797,994 | Morrow | Mar. 24, 1931 |
| 2,369,791 | Moore | Feb. 20, 1945 |
| 2,636,806 | Winter | Apr. 28, 1953 |
| 2,842,426 | Glocker | July 8, 1958 |
| 2,865,709 | Horn et al. | Dec. 23, 1958 |

FOREIGN PATENTS

| | | |
|---|---|---|
| 15,083 | Great Britain | of 1892 |
| 782,423 | Great Britain | Sept. 4, 1957 |

UNITED STATES PATENT OFFICE

CERTIFICATE OF CORRECTION

Patent No. 3,057,681            October 9, 1962

Donald C. Gernes et al.

It is hereby certified that error appears in the above numbered patent requiring correction and that the said Letters Patent should read as corrected below.

Column 1, line 26, for "fluosilic" read -- fluosilicic --; column 12, line 60, for "(at 70° 1 atm.)" read -- (at 70° F. 1 atm.) --; column 13, line 39, for "0.39 HF" read -- 0.39 lbs. HF --.

Signed and sealed this 21st day of May 1963.

(SEAL)
Attest:

ERNEST W. SWIDER
Attesting Officer

DAVID L. LADD
Commissioner of Patents